United States Patent
Hasty et al.

(10) Patent No.: US 11,676,224 B2
(45) Date of Patent: *Jun. 13, 2023

(54) INTERACTIVE SERVING TRAY WITH INTEGRATED DIGITAL DISPLAY

(71) Applicant: Royal Caribbean Cruises Ltd., Miami, FL (US)

(72) Inventors: Joey Hasty, Miami, FL (US); David Smith, Orlando, FL (US); Josh Nakaya, Glendale, CA (US)

(73) Assignee: Royal Caribbean Cruises, Ltd., Miami, FL (US)

( * ) Notice: Subject to any disclaimer, the term of this patent is extended or adjusted under 35 U.S.C. 154(b) by 183 days.

This patent is subject to a terminal disclaimer.

(21) Appl. No.: 17/063,920

(22) Filed: Oct. 6, 2020

(65) Prior Publication Data
US 2021/0019842 A1    Jan. 21, 2021

Related U.S. Application Data

(63) Continuation of application No. 16/178,555, filed on Nov. 1, 2018, now Pat. No. 10,796,388.

(51) Int. Cl.
*G06Q 50/12* (2012.01)
*G06Q 30/06* (2023.01)
*G08B 7/06* (2006.01)
*G06Q 30/0601* (2023.01)

(52) U.S. Cl.
CPC ......... *G06Q 50/12* (2013.01); *G06Q 30/0635* (2013.01); *G08B 7/06* (2013.01)

(58) Field of Classification Search
CPC ....... G06Q 50/12; G06Q 30/0635; G08B 7/06
See application file for complete search history.

(56) References Cited

U.S. PATENT DOCUMENTS

| | | | | |
|---|---|---|---|---|
| 7,132,926 | B2 * | 11/2006 | Vaseloff | G06Q 10/087 340/572.1 |
| 7,692,920 | B2 * | 4/2010 | Feret | A47G 19/025 361/679.55 |
| 10,796,388 | B2 * | 10/2020 | Hasty | G08B 3/10 |

* cited by examiner

*Primary Examiner* — Paul Danneman
(74) *Attorney, Agent, or Firm* — CRGO Global; Steven M. Greenberg

(57) ABSTRACT

An interactive serving tray is adapted to facilitate the delivery of food or beverages in a hospitality environment. The interactive serving tray includes a platter defined by a flat surface encompassed by a perimeter barrier, and a mobile computing device affixed to the platter, the device including at least one processor, memory, a communications adapter and a display. Finally, the interactive serving tray includes a delivery manager module stored in the memory and executing by the processor, and including computer program instructions operable to perform receiving into the memory through the adapter, an order of a food or beverage item and identity information of a customer associated with the order, such as a digital image of the customer, and displaying the identity information in the display.

12 Claims, 2 Drawing Sheets

INTERACTIVE SERVING TRAY WITH INTEGRATED DIGITAL DISPLAY

CROSS-REFERENCE TO RELATED APPLICATIONS

This application is a Continuation of U.S. patent application Ser. No. 16/178,555, filed Nov. 1, 2018, the entirety of which is incorporated herein by reference.

BACKGROUND OF THE INVENTION

Field of the Invention

The present invention relates to the field of food and beverage service delivery and more particularly to a serving tray adapted to support the delivery of food and beverages in a hospitality services environment.

Description of the Related Art

In the hospitality industry, particular the hotel and transportation subsegments, food and beverage services remain an integral aspect of the general delivery of hospitality services. In the transportation subsegment, for example, in the course of transporting a passenger between origin and destination, food and beverages may be provided to the passenger. Likewise, in the hospitality subsegment, in the course of lodging a guest, food and beverages may be provided to the guest. In many instances, a multiplicity of individuals may seek the purchase and delivery of food or beverages within a bounded area in a concurrent manner so that a wait staff is required to deliver the ordered food or beverages to respective customers from the kitchen or bar. In many instances, multiple orders are transported from source to customer at the same time through the use of a serving tray.

Because individual wait staff oftentimes must serve ordered food or beverages on a serving tray to multiple different patrons in one trip, or even to one patron in a crowded space, knowing the location of the different patrons is of paramount importance in minimizing the time traveled from food or beverage source to patron, thus minimizing the probability of food or beverages placed on the serving tray from spilling or falling to the floor. However, the problem of minimizing travel time from source to patron can be compounded when the patron is not stationary at a table or in a room, but roaming a confined area as is often the case in a crowded outdoor pool area or indoor bar area or hotel lobby.

BRIEF SUMMARY OF THE INVENTION

Embodiments of the present invention address deficiencies of the art in respect to food and beverage delivery and provide a novel and non-obvious method, system and computer program product for an interactive serving tray adapted to facilitate the delivery of food or beverages in a hospitality environment. In an embodiment of the invention, an interactive serving tray is adapted to facilitate the delivery of food or beverages in a hospitality environment. The interactive serving tray includes a platter defined by a flat surface encompassed by a perimeter barrier, and a mobile computing device affixed to the platter, the device including at least one processor, memory, a communications adapter and a display. Finally, the interactive serving tray includes a delivery manager module stored in the memory and executing by the processor, and including computer program instructions operable to perform receiving into the memory through the adapter, an order of a food or beverage item and identity information of a customer associated with the order, such as a digital image of the customer, and displaying the identity information in the display.

In one aspect of the embodiment, the computer program instructions are further operable to receive through the adapter, an indication of a contemporaneous location of the customer and display in the display, the indication of the contemporaneous location. In another aspect of the embodiment, the computer program instructions are yet further operable to subsequently receive through the adapter, an indication of a changed location of the customer, to generate a visual or audible alert in the mobile computing device and to display the indication of the changed location. In yet another aspect of the embodiment, the computer program instructions are further operable to receive through the adapter, an indication of a contemporaneous location of a different individual associated with the customer and to display the indication of the contemporaneous location.

In even yet another aspect of the embodiment, the computer program instructions are further operable to receive through the adapter, an indication of a contemporaneous location of the customer, to compute a navigation route from a contemporaneous location of the serving tray to the contemporaneous location of the customer and to display the computed navigation route. Finally, in a further aspect of the embodiment, the computer program instructions are further operable to receive in a user interface to the mobile computing device, an indication that the food or beverage item has been delivered to the customer and to transmit through the adapter, the indication that the food or beverage item has been delivered to the customer.

In a different embodiment of the invention, a data processing system is adapted to support a multiplicity of interactive serving trays, each being adapted to facilitate the delivery of food or beverages in a hospitality environment. The system includes a host computing system including one or more computers, each with memory and at least one processor. The system also includes a multiplicity of interactive serving trays communicatively coupled to the host computing system over a computer communications network. Finally, the system includes a server tray management module stored in the memory of the host computing system. The server tray management module includes program instructions enabled during execution to transmit to each of the different interactive serving trays, different orders of different food or beverage items for different customers, along with identity information for the different customers.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for an interactive serving tray adapted to facilitate the delivery of food or beverages in a hospitality environment. In accordance with an embodiment of the invention, a mobile computing device is affixed to a serving tray. The mobile computing device includes a communications adapter through which data may be received from a transmitter of a remotely disposed order processing system. The mobile computing device additionally provides a display through which the data received through the adapter is displayed. The data may include, for example, a digital image of a customer ordering food or beverages, an indication of a last known location of the customer, an image of an individual with whom the customer is known to be contemporaneously co-located, or a map indicating a suggested route to the customer. Importantly, the data displayed in the display may change as the location of the customer changes, even while the serving tray is carried from a source of the food or beverages to the customer. To that end, a visual or audio alert may be presented through the serving tray as data displayed in the display is updated through the adapter. As well, upon delivery of the food or beverages to the customer, the mobile computing device may transmit a delivery message through the communications adapter to the remotely disposed order processing system.

Figure 1:
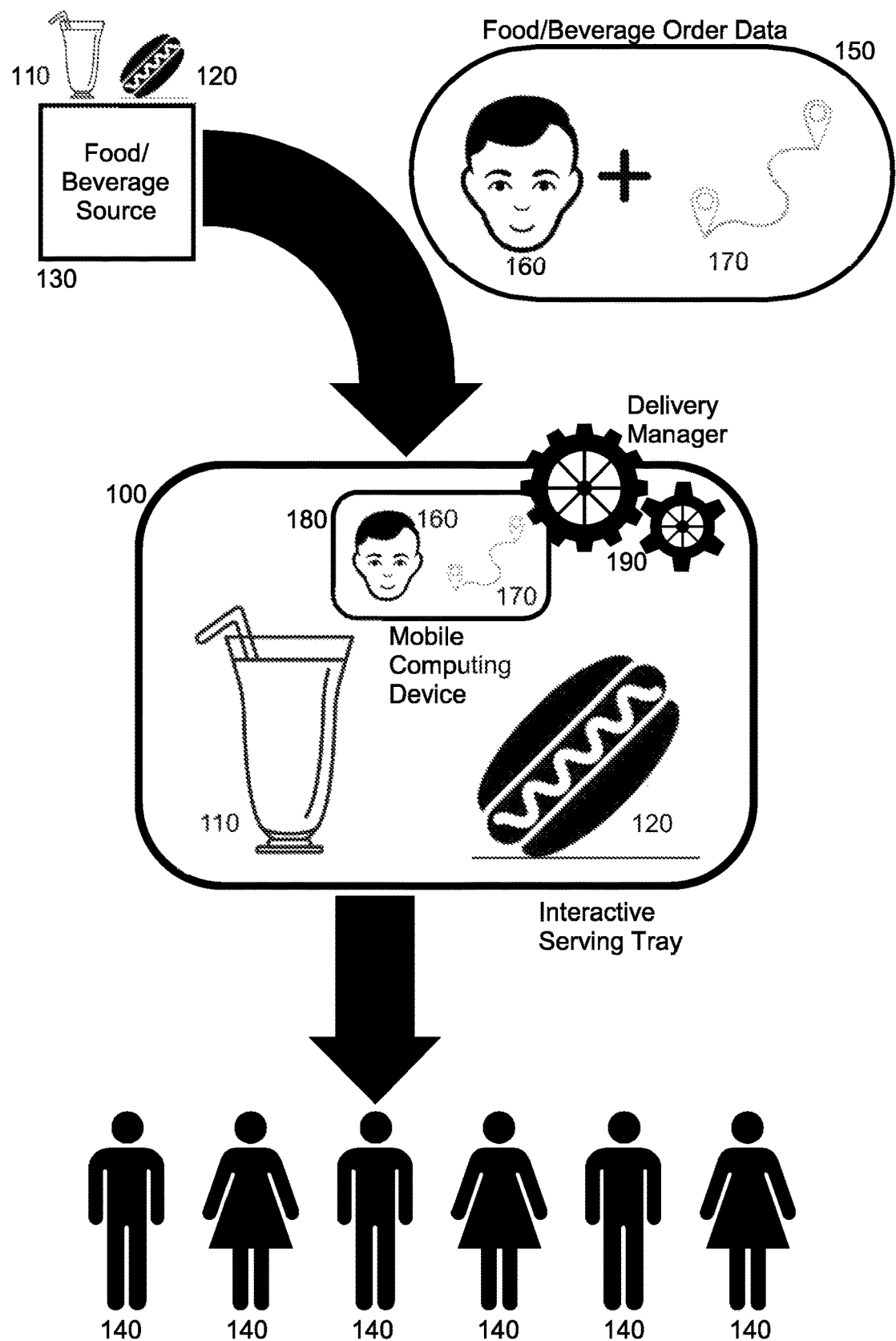
FIG. 1 is a pictorial illustration of an interactive serving tray adapted to facilitate the delivery of food or beverages in a hospitality environment.

In further illustration, FIG. 1 pictorially shows an interactive serving tray adapted to facilitate the delivery of food or beverages in a hospitality environment. As shown in FIG. 1, an interactive serving tray 100 has affixed thereto a mobile computing device 180, for instance flush mounted to a top surface of a platter portion of the serving tray 100 enclosed by perimeter barrier. Different customers 140 within a defined geographic area present orders to a food and beverage source 130 for different beverage items 110, food items 120 or both. When a particular order of beverage items 110 and/or food items 120 is ready to be served to a corresponding one of the customers 140, the interactive serving tray 100 receives at the food and beverage source 130, data 150 indicative of an image 160 of the corresponding one of the customers 140 and a last known location 170 of the corresponding one of the customers 140.

Delivery manager logic 190 executing in memory of the mobile computing device 180 then processes the data 150 to display the image 160 in a display portion of the mobile computing device 180 along with an indication of the last known location 170, for example a textual specification of the last known location, or as an alternative, a navigation route from a location of the interactive serving tray 100 to the last known location 170 of the corresponding one of the customers 140. Upon the beverage items 110 and/or food items 120 having been successfully delivered to the corresponding one of the customers 140, an indication can be provided through a user interface presented in the mobile computing device 180 of the delivery so that the deliver manager logic 190 may then transmit to an order processing system that the order had been successfully delivered to the corresponding one of the customers 140.

Figure 2:
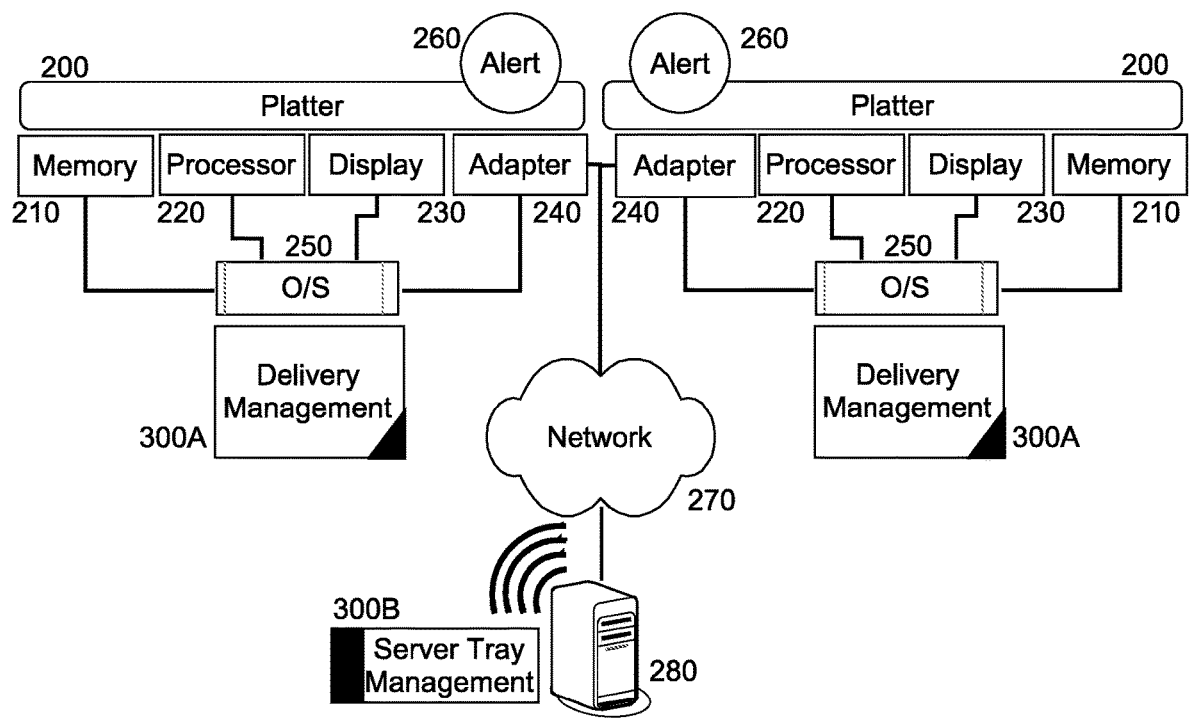
FIG. 2 is a schematic illustration of a data processing system adapted to support a multiplicity of interactive serving trays, each being adapted to facilitate the delivery of food or beverages in a hospitality environment; and, FIG. 3 is a flow chart illustrating a process for supporting food or beverage delivery through an interactive serving tray.

The process described in connection with FIG. 1 may be implemented in a computer data processing system. In further illustration, FIG. 2 schematically shows a=a data processing system adapted to support a multiplicity of interactive serving trays, each being adapted to facilitate the delivery of food or beverages in a hospitality environment. The system includes a host computing system 280 that includes one or more computers, each with memory and at least one processor. The host computing system 280 is communicatively coupled to different interactive serving trays over computer communications network 270, for instance by way of wireless communications.

Each of the interactive serving trays includes a platter 200 bounded by a perimeter barrier to prevent food and beverage items disposed on a top surface of the platter 200 from falling off the platter 200. Affixed to the platter 200 is a mobile computing device that includes memory 210, at least one processor 220, a display 230 and a communications adapter 240, such as a wireless network interface card, or cellular broadband communications circuitry. The mobile computing device may be embedded in a top surface of the platter 200, or mounded to the perimeter barrier of the platter 200, as two differing examples.

An operating system 250 executes in the memory 210 and supports the operation of a delivery management module 300A. The delivery management module 300A includes computer program instructions operable to communicate over the computer communications network 270 with computer program instructions of a server tray management module 300B executing in the memory of the host computing system 280. In this regard, the program instructions of the server tray management module 300B transmit to the program instructions of the delivery management module 300A by way of adapter 240, an indication of an order of food and/or beverages along with data identifying a customer to receive the food and/or beverages. Optionally, the data includes a last known location of the customer, either expressly, or in connection with a known location of a different individual known to be proximate to the customer.

The program instructions of the delivery management module 300A are further enabled to display in the display 230 an image of the customer as provided by the program instructions of the server tray management module 300B, along with a navigation path to the last known location of the customer. Optionally, as the last known location changes, a new location may be provided by the program instructions of the server tray management module 300B over the computer communications network 270 to the program instructions of the delivery management module 300A by way of adapter 240 in response to which the program instructions of the delivery management module 300A generates an alert 260 such as a visual alert or an audible alert along with a new display in the display 230 of a new location. Optionally, the program instructions of the delivery management module 300A display a new navigation route in the display to the changed location.

Figure 3:
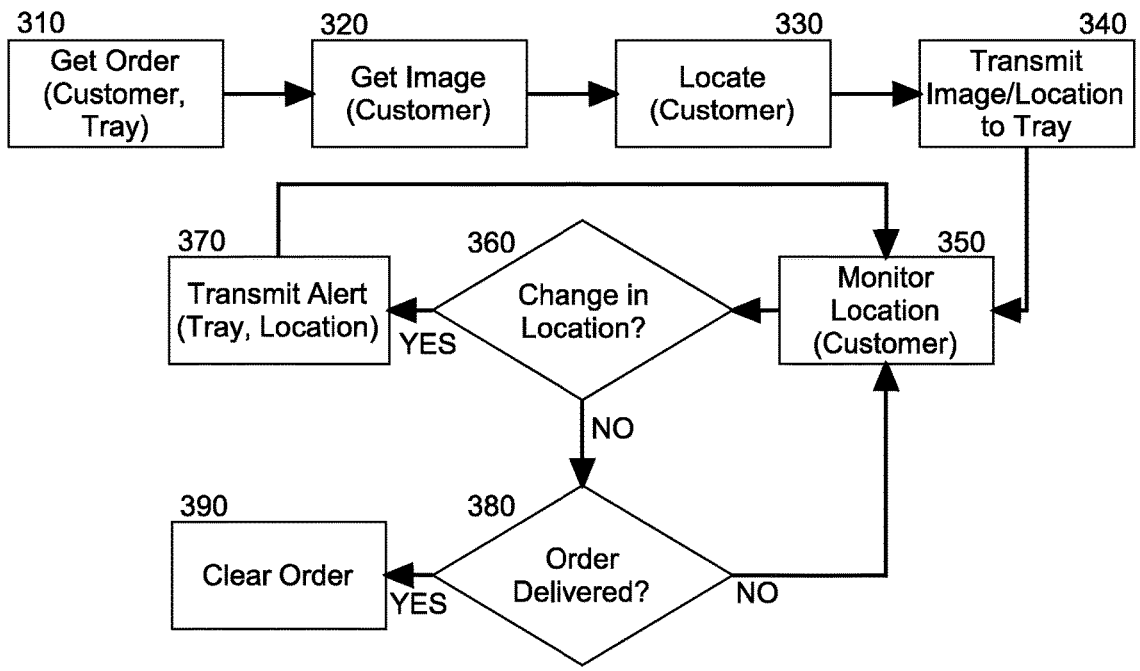

In even yet further illustration of the operation of the delivery management module 300A, FIG. 3 is a flow chart illustrating a process for supporting food or beverage delivery through an interactive serving tray. Beginning in block 310, an order is received for food and/or beverage items in association with a specific interactive serving tray and a specific customer. In block 320, an image of the customer is retrieved as is a location of the customer in block 330. In block 340, the image and location are transmitted to the interactive serving tray for display therein. Thereafter, in block 350, the location of the customer may be monitored to detect any changes in movement of the customer, either directly or implicitly in connection with a change in location of a different individual associated previously with the customer.

In decision block 360, it is determined if the location of the customer has changed. If so, in block 370 an alert is transmitted to the interactive serving tray along with a new location of the customer. Thereafter, once again the location of the customer is monitored in block 350. In decision block 360, if no change in location is determined, in decision block 380 it is further determined if the order has been successfully delivered. If not, once again the location of the customer is monitored in block 350 and the process repeats. In decision block 380, when it is ultimately determined that the order has been successfully delivered, in block 390 the order is cleared from the interactive serving tray.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. An interactive serving tray adapted to facilitate the delivery of food or beverages in a hospitality environment, the interactive serving tray comprising:
a platter defined by a flat surface encompassed by a perimeter barrier;
a host computing data processing system comprising at least one processor and memory and a communications adapter, and communicatively coupled through the communications adapter over a computer communications network to a mobile computing device affixed to the platter; and,
a delivery manager module stored in the memory and executing by the at least one processor, the module comprising computer program instructions operable to perform:
receiving into the memory through the adapter, an order of a food or beverage item and identity information of a customer associated with the order along with a different individual associated with the customer;
determining a location of the customer at a time of the order;
transmitting to the mobile computing device for displaying in a display of the mobile computing device, the determined location and the identity information; and,
prior to confirming delivery of the order to the determined location, detecting a change in location of the individual associated with the customer and transmitting an alert to the mobile computing device indicating the change in the location.

2. The tray of claim 1, wherein the identity information is a digital image of the customer.

3. The tray of claim 1, wherein the computer program instructions are yet further operable to perform:
subsequently receiving through the adapter, an indication of a changed location of the customer;
generating an alert in the mobile computing device, selected from the group consisting of a visual alert and an audible alert; and,
displaying in the display, the indication of the changed location.

4. The tray of claim 1, wherein the computer program instructions are further operable to perform:
receiving through the adapter, an indication of a contemporaneous location of the customer;
computing a navigation route from a contemporaneous location of the serving tray to the contemporaneous location of the customer; and,
displaying in the display, the computed navigation route.

5. The tray of claim 1, wherein the computer program instructions are further operable to perform:
receiving in a user interface to the mobile computing device, an indication that the food or beverage item has been delivered to the customer; and,
transmitting through the adapter, the indication that the food or beverage item has been delivered to the customer.

6. A data processing system adapted to support a multiplicity of interactive serving trays, each being adapted to facilitate the delivery of food or beverages in a hospitality environment, the system comprising:
a host computing system comprising one or more computers, each with memory and at least one processor;
a multiplicity of interactive serving trays communicatively coupled to the host computing system over a computer communications network, each of the interactive serving trays comprising:
a platter defined by a flat surface encompassed by a perimeter barrier;
a mobile computing device affixed to the platter; and,
a delivery manager module stored in the memory of the host computing system and executing by the at least one processor of the host computing system, the module comprising computer program instructions operable to perform:
receiving into the memory through the adapter, different orders of a food or beverage item and identity information of a corresponding customer associated with a corresponding one of the orders along with a different individual associated with the corresponding customer; and,
transmitting the identity information to the mobile computing device for display therein; and,
a server tray management module stored in the memory of the host computing system, the server tray management module comprising program instructions enabled during execution to perform:
transmitting to each of the different interactive serving trays, different orders of different food or beverage items for different customers, along with identity information for the different customers; and,
prior to confirming delivery of one of the orders to a previously determined location of a corresponding one of the different customers, detecting a change in location of the individual associated with the corresponding one of the different customers and transmitting an alert to the mobile computing device indicating the change in the location.

7. The system of claim 6, wherein the identity information is a digital image of the customer.

8. The system of claim 6, wherein the computer program instructions of the delivery manager module are further operable to perform:
receiving through the adapter, an indication of a contemporaneous location of the customer; and,
transmit to a selected one of the interactive serving trays the indication of the contemporaneous location.

9. The system of claim 8, wherein the computer program instructions of the delivery manager module are yet further operable to perform:
subsequently receiving through the adapter, an indication of a changed location of the customer;
generating an alert in the mobile computing device, selected from the group consisting of a visual alert and an audible alert; and,
transmitting through the adapter to the mobile computing device, the indication of the changed location.

10. The system of claim 6, wherein the computer program instructions of the delivery manager module are yet further operable to perform:
receiving through the adapter, an indication of a contemporaneous location of the customer;
computing a navigation route from a contemporaneous location of the serving tray to the contemporaneous location of the customer; and,
transmitting through the adapter to the mobile computing device, the computed navigation route.

11. A computer program product for facilitating the delivery of food or beverages in a hospitality environment, the computer program product including a computer readable storage medium having program instructions embodied therewith, the program instructions executable by a device to cause the device to perform a method including:
- receiving into the memory through an adapter of a host computing system, an order of a food or beverage item, an image of a customer associated with the order and an indication of a contemporaneous location of the customer; and
- transmitting the image and a navigation route to the contemporaneous location to a mobile computing device for display therein;
- detecting a change to a new location of an individual associated with the customer; and,
- transmitting an alert to the mobile computing device indicating the change to the new location and a navigation route to the new location.

12. The computer program product of claim 11, wherein the method further comprises:
- receiving from in a user interface to the mobile computing device, an indication that the food or beverage item has been delivered to the customer; and,
- transmitting through the adapter to a remote order processing system, the indication that the food or beverage item has been delivered to the customer.

\* \* \* \* \*